March 11, 1958     D. A. PAYNTER     2,826,731
TRANSISTOR CONVERTER
Filed Feb. 7, 1956
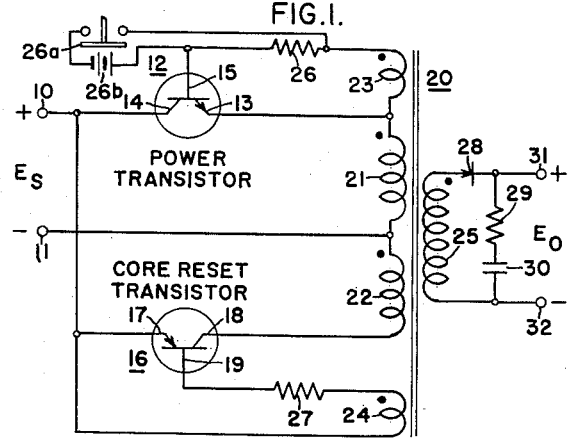
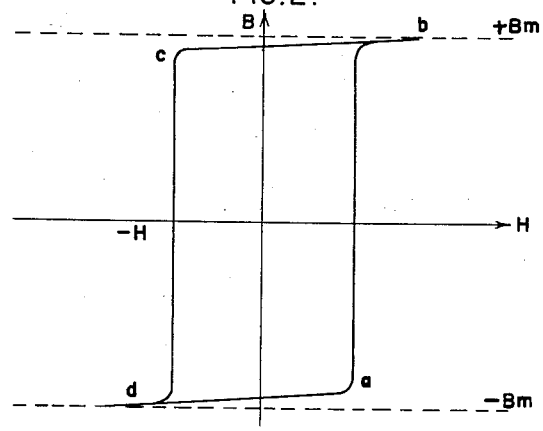
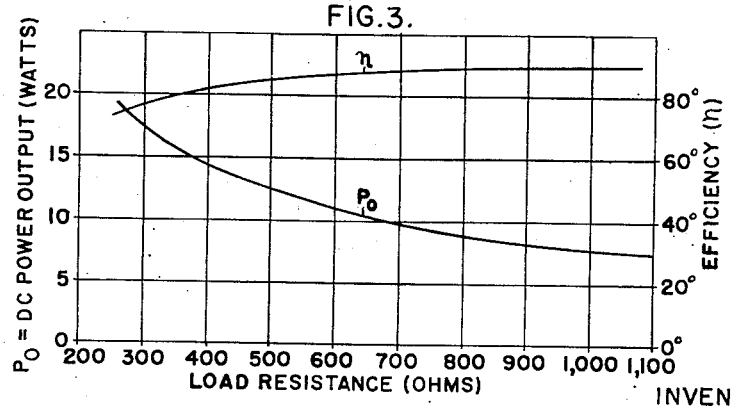
INVENTOR:
DONALD A. PAYNTER,
BY
HIS ATTORNEY.

United States Patent Office 2,826,731
Patented Mar. 11, 1958

2,826,731

TRANSISTOR CONVERTER

Donald A. Paynter, Syracuse, N. Y., assignor to General Electric Company, a corporation of New York Application February 7, 1956, Serial No. 563,926

7 Claims. (Cl. 321—2)

The present invention relates, in general, to power translating circuits and, in particular, to circuits for accepting energy from a source of unidirectional potential at one value of unidirectional potential and delivering it to a load at another value of unidirectional potential.

Various such translating circuits have been proposed in the art. One such translating circuit involves the use of a transitor in an oscillating circuit for which the unidirectional source of potential supplies the energization. The alternating output developed by the oscillating circuit is supplied through a rectifier to a load. Such circuit arrangements are inefficient and do not effectively utilize the full power handling capabilities of the transistor.

Another such translating circuit makes use of a pair of power transistors connected in a symmetrical push-pull square wave generation circuit. The output from such a circuit is supplied through a full wave rectifier to a load. One rectifier passes current during the conduction of one transistor, and the other rectifier passes current during the conduction of the other transistor. Such circuits are efficient; however, they require two power transistors which are presently quite expensive as compared to the cost of a signal or low power transistor. The use of two power transistors may be justified where their full power handling capabilities are required. However, in many applications, it is desirable to have the efficiency of the push-pull circuit arrangement without requiring the power handling capabilities of two power transistors.

Accordingly, it is an object of this invention to provide a new and improved D.-C. to D.-C. converter requiring the use of only one power transistor without appreciable sacrifice in efficiency and power handling capacity over a circuit using two power transistors.

A further object of this invention is to provide a new and improved D.-C. to D.-C. converter in which effective utilization is made of the power-handling capabilities of a single power transistor, particularly where it is desired to convert voltages which are small as compared to the peak inverse voltage rating of the power transistor.

A further object of the present invention is to provide a new and improved transistor D.-C. to D.-C. converter of medium power which provides the combined advantages of efficiency, economy and simplicity.

In carrying out the present invention in one form, applicant provides a pair of transistors, one of said transistors capable of passing large currents and the other capable of passing only small currents, and a core of magnetic material having wound thereon a plurality of windings, including an output winding. Means are further provided for connecting the emitter-base and emitter-collector conduction paths of each of said transistors in circuit with said windings in a manner that the emitter-collector paths of said transistors are rendered alternately conductive through respective windings to magnetize said core in alternate directions when a unidirectional potential is applied in circuit with each of said emitter-collector paths and said windings. Thus across said output winding is obtained an alternating voltage. Applicant still further provides means for conductively connecting said output winding in circuit with a load during that phase of voltage corresponding to current conduction in the emitter-collector path of the transistor having large current carrying capabilities.

These and other objects of this invention will be more clearly understood from the following description taken in connection with the accompanying drawings and its scope will be apparent from the appended claims.

In the drawings:

Figure 1 shows a schematic diagram of a transistor D.-C. to D.-C. converter utilizing a single-power transistor in accordance with the present invention;

Figure 2 shows a desirable hysteresis characteristic, that is, a graph of magnetic induction versus magnetizing force, for the core of the transformer used in the circuit of the present invention; and Figure 3 shows graphs of efficiency of power conversion and power output as a function of load resistance for the circuit of Figure 1.

Referring now to Figure 1, there is shown an illustrative embodiment of the present invention comprising an NPN transistor 12 of large power handling capabilities including an emitter 13, a collector 14 and a base electrode 15, a signal or a low power PNP transistor 16 having an emitter 17, a collector 18 and a base electrode 19, and a transformer 20 having main or primary windings 21 and 22, feedback windings 23 and 24, and secondary or output winding 25. Those skilled in the art will recognize an NPN transistor as one in which the emitter and collector electrodes are constituted of N-type conductivity semiconductor material and the base of which is constituted of P-type conductivity semiconductor material. Similarly, a PNP transistor is one in which the emitter and collector electrodes are constituted of P-type conductivity semiconductor material and the base electrode is constituted of N-type conductivity semiconductor material. Also, as the polarities of voltages developed across the various windings of the transformer are material to the operation of the present circuit, a dot has been affixed adjacent that end of each winding which has the same polarity of voltage with respect to the other end thereof for a predetermined direction of magnetization of the core of the transformer as every other winding so designated, and for the sake of convenience in the ensuing description, that end shall be referred to as the positive terminal of the winding.

The input terminal 10 is connected to collector electrode 14. Emitter electrode 13 is connected to the positive terminal of winding 21 and to the negative terminal of feedback winding 23. Base electrode 15 is connected through a current-limiting or biasing resistance 26 to the positive terminal of feedback winding 23. The resistance 26 is shunted by a starting circuit including a single pole, single throw switch 26a connected in series with a battery 26b. Of course, the battery is poled such that when the switch 26a is closed, the emitter 13 is biased negatively with respect to base 15. Input terminal 10 is also connected to the emitter electrode 17 and to the negative terminal of feedback winding 24. Base electrode 19 is connected through a current-limiting or biasing resistance 27 to the positive terminal of feedback winding 24. The collector electrode 18 of transistor 16 is connected to the negative terminal of winding 22, the positive terminal of which is connected to the negative terminal of winding 21 and to the other input terminal 11.

The positive terminal of secondary winding 25 is connected to the anode of unilaterally conducting device 28, the cathode of which is connected to output terminal 31. The negative terminal of secondary winding 25 is connected to output terminal 32. A secondary loading resistance 29 and a capacitance 30 are connected in series in the order named between the output terminals 31 and 32 to form a filter for the circuit arrangement. Secondary loading resistance 29 prevents short circuit of the primary and feedback windings at the instant of activation of the circuit, thus assuring that oscillations build up in the circuit as will be fully explained below. Of course, it will be obvious to those skilled in the art that any of a variety of filters equivalent in effect to that shown may be utilized, if desired.

Referring now to the operation of the circuit shown in Figure 1, unidirectional potential is applied between terminals 10 and 11, so that the terminal 10 is positive with respect to terminal 11. Initially, it will be assumed that secondary winding 25 is open-circuited. Since the converter of Figure 1 is ordinarily not self-starting, oscillation is initiated in the present embodiment by momentarily closing switch 26 and thereby applying a small forward current bias in the base-emitter circuit of the power transistor 12. It will be recognized by those skilled in the art that there are other ways of initiating a forward bias current in the emitter circuit of transistor 12, for example, by applying a short pulse across resistance 26, or by connecting a resistance between collector electrode 14 and base electrode 15. Application of proper bias to power transistor 12 renders it conductive, thereby causing current flow from the collector to the emitter electrode thereof. During such current flow, the voltage drop across transistor 12 is small and the supply voltage $E_s$ effectively appears across winding 21 of transformer 20. Consequently, current is caused to flow in this winding to develop a magnetic flux or field in the winding having a time rate of change such as to develop a counter-electromotive force across winding 21 to balance the applied electromotive force $E_s$. This relationship is expressed by the equation:

$$E = N\frac{d\phi}{dt} \qquad (1)$$

where E is counter-electromotive force, N is the number of turns on the winding 21, $\phi$ represents total magnetic flux linking the winding and $t$ represents time. Since the flux developed in the winding 21 is proportional to current in the winding, the time rate of change of current through the winding, Equation 1, may also be represented by:

$$E = L\frac{di}{dt} \qquad (2)$$

where L is the inductance of the winding and $i$ is the current flow through the winding. Since the applied electromotive force is constant, the time rate of change of flux, and consequently the time rate of change of current in the winding 21, is a constant. Accordingly, current increases in the winding 21 from zero at a rate sufficient to maintain the counter-electromotive force across the winding 21. As the current increases and reaches large values, the core of transformer 20 becomes saturated, that is, for an increment of magnetizing force or current at greater and greater currents, the corresponding increment in magnetic flux gets smaller and smaller. Thus, to develop sufficient back electromotive force, the current has not only to increase, but also has to increase at a faster rate through the collector-emitter path. The current injected into the emitter-base circuit has to increase in order to sustain this increase in current flow in the emitter-collector circuit. Since the voltage across the feedback winding 23 cannot exceed a predetermined voltage determined by $E_s$, the supply voltage, and the ratio of turns on winding 21 to turns on winding 23, the current increases at a decreasing rate, thereby inducing less voltage in feedback winding 23 and further reducing current flow through transistor 12 until a peak of current is reached after which the current decays to zero due to loss of excitation, and also to the now oppositely directed counter-electromotive force developed in winding 21.

During the decay of current through winding 21, a voltage is also induced across feedback winding 24 in a direction to make its negative terminal positive with respect to its positive terminal. Accordingly, current bias is established in the emitter-base circuit of transistor 16 to render transistor 16 conductive. Current now increases through the winding 22 to a peak, and thereafter decreases to zero in a manner described above in connection with winding 21 and transistor 12. Of course, decaying current in winding 22 induces voltage in winding 23 which again causes conduction in transistor 12. Thus, transistors 12 and 16 are alternately rendered conductive through windings 21 and 22, respectively, to cause an alternating flux to be developed in transformer 20 and an alternating voltage to appear across secondary winding 25.

Now considering the secondary or output circuit of the converter arrangement, the unilaterally conducting device 28 is poled in such a direction as to be conductive when the positive terminal of winding 25 is positive with respect to the negative terminal thereof. The positive terminal of winding 25 is positive when the positive terminal of winding 21 is positive and this condition in turn coincides with the interval during which power transistor 12 is conducting. The voltage developed across the secondary winding 25 causes current to flow through a load connected across output terminals 31 and 32. This current causes current to flow in the primary or main winding 21 without substantially affecting the time variations of magnetic flux in the core over what they were when the secondary winding 25 was open. Also, when the positive terminal of winding 25 is negative with respect to the other terminal, the rectifier 28 is reversely biased, and hence no current is drawn by the load. Thus, current is supplied to the load only during the time of conduction of transistor 12. Accordingly, only transistor 12 need have sufficient current carrying capacity to supply the load. Transistor 16 need have capacity sufficient only to carry the exciting current for winding 22.

Referring now to Figure 2, there is shown a graph of magnetic induction B versus magnetizing force H, commonly referred to in the art as a hysteresis loop, for a magnetic material desirable for use as the core of the transformer. The magnetizing force which is proportional to current in the magnetizing coil is represented along the abscissa axis and the resultant magnetic induction, magnetic lines of force per unit area is plotted along the ordinate. Core material Orthonal has this characteristic.

A very desirable core from a standpoint of efficient converter operation is that of a toroidal tape-wound variety. These can be had in a variety of magnetic materials, those materials which exhibit a relatively square hysteresis loop, high saturation flux density, and a low coersive force should be selected.

In the steady state condition of operation, the intercept of the loop with the $-B$ axis represents the time that excitation current starts flowing through transistor 12 and winding 21. The current increases very rapidly to point $a$ since this increment of current produces little change in flux. From point $a$ to point $b$, the current increases at a substantially uniform and slower rate. In the vicinity of point $b$, the current reaches a peak as explained in the preceding paragraphs, and thereafter decays rapidly from point $b$ to the point where the loop intersects the $+B$ axis at which time the current flow through transistor 12 ceases and current flow starts in transistor 16 and winding 22. Note that this current flows in a direction to reverse the magnetization of the core of transformer 20. The current increases very rapidly from point of interception of the $+B$ axis to point $c$ at which time it continues to increase at a slower rate and uniformly to point $d$. In the vicinity of point $d$, the core becomes saturated, as explained above, and the current very rapidly decreases to the point where the loop intersects the —B axis at which time transistor 12 again starts to conduct. Note that the current flow through coil 22 is in a direction to demagnetize the core from substantially saturation flux to zero and then to remagnetize the core again to the point d. The time it takes for magnetization to change from d to a and from b to c is short in comparison to the changes from a to b and from c to d, and represents the time of switch-over from conduction in one transistor to the other and back again. Preferably the graph between point a and b is linear and quite steep with a decreasing rate of rise in the vicinity of saturation. With a loop having a steadily decreasing rate of rise with a long and pronounced cusp, large currents would flow through transistors and windings during this part of the excitation cycle with resultant energy loss, thereby cutting down efficiency.

It should be observed that if winding 21 has the same number of turns as winding 22, the core is saturated at the same maximum current for each winding at the time it takes the current of each winding to reach the saturation value is the same. However, if one winding, for example winding 21, has a greater number of turns than the other winding, for example twice as many, it would take only one-half as much current to saturate the core and in addition the rate of change of current required to develop the same back electromotive force is one-quarter. Accordingly, current would flow through winding 21 twice as long as it would flow through winding 22. Conversely, the maximum current in winding 22 is now twice as much and changes at a rate of four times greater. Thus, while it is desirable to have transistor 21 conduct for as long a time as possible, on the other hand, it should not be so great as to cause such a large rate of change of current in winding 22 which would induce voltage in winding 21 which, when combined with $E_s$, would exceed the inverse voltage rating of the transistor.

The manner in which periods of conduction of transistors 12 and 16, denoted $t_1$ and $t_2$, respectively, can be set so that the power handling capabilities of power transistor 12 may be more advantageously utilized will be apparent from the relations developed in the following paragraphs. The maximum power capable of being delivered to winding 21 and hence to a load when power transistor 12 conducts is given by the expression:

$$P_1 = E_s I \left(\frac{t_1}{T}\right) \qquad (3)$$

where I is the maximum continuous collector current rating of power transistor 12, $t_1$ is the period of conduction of transistor 12, and $T = t_1 + t_2$ (neglecting switching time) represents the time of a complete cycle of operation of the circuit. When transistor 16 is conducting during the reset period $t_2$, the inverse voltage between emitter and collector of power transistor 12 is given by the expression:

$$E = E_s\left(\frac{T}{t_2}\right) = E_s\left(\frac{T}{T - t_1}\right) \qquad (4)$$

Equation 4 follows from the fact that when transistor 16 is conducting, the voltage between collector electrode 14 and emitter electrode 13 is the sum of the voltages induced in windings 22 and 21. This voltage is given by the expression:

$$E = E_s\text{(for winding 22)} + E_s\frac{t_1}{t_2}\text{(for winding 21)} \qquad (5)$$

It should be noted that the ratio of time of conduction in winding 21 to time of conduction in winding 22 is equal to the ratio of turns of winding 21 to winding 22.

Equation 4 can be written as follows:

$$\frac{t_1}{T} = 1 - \frac{E_s}{E} \qquad (6)$$

Substitution of Equation 6 in Equation 3 gives the following:

$$P_1 = E_s I\left(1 - \frac{E_s}{E}\right) \qquad (7)$$

Consequently, the maximum power capable of being delivered by transistor 12 is obtained when E is large compared with $E_s$ since under this condition $P_1$ approaches $E_s I$. The magnitude which E is permitted to reach is limited by the peak inverse voltage rating of power transistor 12. Accordingly, the maximum power for a given input voltage $E_s$ in the circuit of Figure 1 is given by the expression:

$$P_1 = E_s I\left(1 - \frac{E_s}{E_p}\right) \qquad (8)$$

where $E_p$ is the peak inverse voltage rating of the power transistor 12.

A comparison of the power handling abilities of the single-power transistor shown in Figure 1 with that of a two-power transistor circuit is now in order. The expression for maximum power for a transistor converter circuit having two-power transistors is:

$$P_2 = E_s I \qquad (9)$$

By comparing Equations 8 and 9, it is seen that with a low input voltage ($E_s$) and with a high peak inverse voltage rating ($E_p$), the power delivered by the circuit of Figure 1 approaches that delivered by a converter utilizing two-power transistors. Since the ratio $$\frac{E_s}{E_p}$$

is ordinarily small in many applications, only a small decrease in power output results in the use of the single power transistor converter shown in Figure 1 as compared with its two-power transistor counterpart.

While it will be understood that the circuit specifications for the transistor converter shown may vary according to the design or application, the following circuit parameters are included, by way of example only, as suitable for operation from a 12-volt supply:

Transistor 12—NPN remote base power transistor having an $E_p = 50$ volts; a D.-C. current gain of 26 at 1 ampere, i. e. collector current; 21 at 2 amperes collector current; and 6.5 at 5 amperes collector current.
Transistor 16—General Electric Type 2N45.
Rectifier 28—Two General Electric Type 1N93 germanium junction diodes.
Transformer 20:
    (a) Core specifications—
        1 mil Orthonal tape wound toroid No. 50133 manufactured by Magnetics, Inc., Butler, Pennsylvania; area = 0.451 cm.²; magnetic path length = 7.19 cm.
    (b) Turns data—
        Winding 21 = 80 turns No. 22 wire,
        Winding 22 = 27 turns No. 27 wire,
        Winding 23 = 13 turns No. 27 wire,
        Winding 24 = 4 turns No. 27 wire,
        Winding 25 = 640 turns No. 31 wire.
Resistance 26 = 2 ohms for heavier loads to 20 ohms for lighter converter loads.
Resistance 27 = 20 ohms
Resistance 29 = 40 ohms.
Capacitance 30 = 150 mfd.

A remote base transistor refers to that type of transistor in which an effective base connection is made not directly to the base of the transistor, which is usually quite thin and difficult to make connection to, but rather by means of a P–N junction region in the emitter portion of the transistor and adjacent to the emitter-base junction. This type of device was utilized for reasons of convenience and many other types of transistors are suitable in the circuits of the present invention.

Figure 3 shows the performance of a single-power transistor converter having the aforesaid circuit parameters. Power output and overall efficiency are plotted as a function of load resistance. In the range of power outputs indicated, the efficiency is seen to range from 90% at 6–10 watts down to 75% at 19 watts output. The power output increases non-linearly with a decrease in load resistance. For a constant output voltage, the power output varies inversely as the load resistance. The graphs of Figure 3 indicate that the voltage regulation of the converter of Figure 1 can be considered good because the efficiency graph does not appreciably dip from a no-load to a full-load condition. These curves also indicate that a high power output coupled with excellent overall efficiency can be obtained with the single power transistor D.-C. to D.-C. converter embodied in this invention. As has also already been pointed out, an output power comparable to that obtained from a two-power transistor version can be obtained in those cases where the converter supply voltage is a small fraction of the inverse voltage rating of the power transistor.

Since the circuit of this invention is not ordinarily self-starting, the circuit has the advantage of having overload protection. The feedback current in the base circuit of the power transistor 12 can be adjusted for optimum operation at a specified converter load by resistance 26. When this load value is exceeded by a certain degree, oscillation stops and the input power to the converter drops to zero.

In commenting on the operation, it should be noted that the operating frequency resulting from the core change should not be so high that the transistor switching times are an appreciable part of the cycle.

Another useful mode of operation of this invention results when the roles of the core reset transistor 16 and the power transistor 12 are reversed. This type of operation results in a short duty cycle for the power transistor 12, and a small transformer turns per volt ratio. Under these conditions, it is possible to generate large output voltages (of the order of kilovolts) with a reduced number of secondary turns. Such results are useful for low power, high voltage application, for example, as accelerating potential of a cathode-ray tube.

As will appear obvious to those skilled in the art, a PNP power transistor and an NPN core reset transistor may be utilized in the circuit shown in Figure 1 by merely reversing the polarities of the supply voltage. Also, other configurations may be used with slight circuit modifications. For example, a power transistor and the core reset transistor may both be PNP units. In this arrangement, it would be necessary to reverse the polarity of the supply voltage, to connect the collector electrode of the core reset transistor to the negative terminal of the input supply and to connect the emitter electrode to the negative terminal of winding 22. Conversely, two NPN transistors may be employed using the last-mentioned configuration by merely switching the polarity of the input signal.

Since other modifications varied to fit particular operating requirements and environments will be apparent to those skilled in the art, the invention is not considered limited to the examples chosen for purposes of disclosure and covers all changes and modifications which do not constitute departures from the true spirit and scope of this invention.

What I claim as new and desire to secure by Letters Patent of the United States is:

1. In combination, a pair of transistors, one capable of passing large currents and the other capable of passing only small currents, a core of magnetic material having wound thereon a plurality of input windings and an output winding, means for connecting the emitter-base conduction path of each of said transistors in circuit with a respective one of a pair of said windings and for connecting the emitter-collector conduction paths of each of said transistors in circuit with a respective one of another pair of said windings in such a manner that the emitter-collector conduction paths of each of said transistors are rendered alternately conductive through the winding associated in circuit therewith to alternate the direction of magnetization of said core when a unidirectional potential is simultaneously applied in circuit with each of said emitter-collector conduction paths of said transistors and said windings, whereby across said output winding is obtained an alternating voltage, means for connecting said output winding in circuit with a load during that phase of voltage corresponding to conduction in the emitter-collector path of said one transistor.

2. In combination, a pair of transistors, one capable of handling large amounts of power and the other capable of handling only small amounts of power, and a core of saturable magnetic material having wound thereon a plurality of windings, means connecting the emitter-base conduction path of each of said transistors in circuit with a respective one of a pair of said windings and for connecting the emitter-collector conduction paths of each of said transistors in circuit with a respective one of another pair of said windings in such a manner that the emitter-collector conduction paths of each of said transistors are rendered alternately conductive through the winding associated in circuit therewith to alternate the direction of magnetization of said core when a unidirectional potential is simultaneously applied in circuit with each of said emitter-collector conduction paths of said transistors and said winding, the number of turns on that winding in series circuit with the emitter-collector conduction path of said one transistor being substantially greater than the number of turns on that winding in series circuit with the emitter-collector conduction path of said other transistor, whereby the time of conduction of said one transistor is substantially longer than the time of conduction of said other transistor, an output winding coupled to said core, whereby across said output winding is obtained an alternating voltage, means for connecting said output winding in circuit with a load for that phase of voltage corresponding to conduction in the emitter-collector path of said high-power transistor.

3. In combination, a pair of transistors, one capable of handling large amounts of power and the other capable of handling small amounts of power, and a core of saturable magnetic material having wound thereon a pair of main windings, a pair of feedback windings and an output winding, means for connecting the emitter-base conduction path of each of said transistors in circuit with a respective one of said feedback windings and for connecting the emitter-collector conduction paths of each of said transistors in circuit with a respective one of said main windings, the one of said feedback windings in circuit with said one transistor being poled with respect to the one of said main windings in circuit with said one transistor to render said one transistor conductive during increase in current in said main winding, said other feedback winding being poled with respect to said one main winding to render said other transistor conductive during a decrease in current flow in said one main winding, said other main winding being poled with respect to said other feedback winding to render said other transistor conductive during an increase in current flow through said other main winding and being poled with respect to said one feedback winding to maintain said one transistor nonconductive during such current flow, whereby the emitter-collector conduction paths of each of said transistors are rendered alternately conductive through the respective one of said oppositely-poled main windings to alternate the direction of magnetization of said core when a unidirectional potential is simultaneously applied in circuit with each of said emitter-collector conduction paths of said transistors and its respective main winding, the number of turns on one main winding being substatially greater than the number of turns on said other main winding, whereby across said output winding is obtained an alternating voltage wave in which one polarity of voltage corresponding to the time of conduction of said one transistor is substantially longer than the polarity of voltage corresponding to conduction of said other transistor, and means for connecting said output winding in circuit with a load for said one polarity of voltage.

4. In a converter for converting from one unidirectional voltage to another comprising a pair of transistors, one capable of handling large amounts of power and the other capable of handling small amounts of power, and a core of saturable magnetic material having wound thereon a pair of main windings, a pair of feedback windings and an output winding, means for connecting the emitter-base coduction path of each of said transistors in circuit with a respective one of said feedback windings and for connecting the emitter-collector conduction paths of each of said transistors in circuit with a respective one of said main windings, the one of said feedback windings in circuit with said one transistor being poled with respect to the one of said main windings in circuit with said one transistor to render said one transistor conductive during increase in current in said main winding, said other feedback winding being poled with respect to said one main winding to render said other transistor conductive during a decrease in current flow in said one main winding, said other main winding being poled with respect to said other feedback winding to render said other transistor conductive during an increase in current flow through said other main winding and being poled with respect to said one feedback winding to maintain said one transistor nonconductive during such current flow, means for applying a unidirectional potential in circuit with each of said emitter-collector conduction paths of said transistors and its respective main winding, means for exciting conduction in one of said transistors, whereby the emitter-collector conduction paths of each of said transistors are rendered alternately conductive through the respective one of said oppositely-poled main windings to alternate the direction of magnetization of said core, the number of turns on one main winding being substantially greater than the number of turns on said other main winding, whereby across said output winding is obtained an alternating voltage wave in which one polarity of voltage corresponding to the time of conduction of said one transistor is substantially longer than the polarity of voltage corresponding to conduction of said other transistor, and means for connecting said output winding in circuit with a load for said one polarity of voltage.

5. In combination, a transformer having a saturable core, a first power transistor connected to said transformer for magnetizing the saturable core of said transformer when conducting, a second signal transistor connected to said transformer for resetting the flux in said saturable core when conducting, means for energizing said first and second transistors into conduction, means including a feedback winding on said transformer connected to said second transistor for disabling said second transistor while first transistor is conducting, means including another feedback winding on said transformer connected to said first transistor for disabling said first transistor while said second transistor is conducting, and means including a unidirectional conducting device connected in circuit with the secondary winding of said transformer for rectifying the output of said first transistor and rejecting the output of said second transistor.

6. In a circuit, first power and second signal transistors each having a base electrode, a transformer having primary, feedback and secondary windings thereon, means for connecting said transistors to the primary windings of said transformer, means for applying a unidirectional voltage to said transistors, means including a feedback winding on said transformer connected to the base electrode of said first transistor for disabling said first transistor while said second transistor is conducting, means including another feedback winding on said transformer connected to the base electrode of said second transistor for disabling said second transistor while first transistor is conducting, and unidirectional conducting means connected in circuit with the secondary winding of said transformer for passing the output of said first transistor and stopping the passage of the output of said second transistor appearing in said secondary winding.

7. In combination, first power and second signal transistor devices each having a pair of electrodes and a base electrode, a pair of input terminals, a transformer having a pair of primary windings, a pair of feedback windings and a secondary winding, first and second resistances, means connecting one of said electrodes of said first and second transistors to one of said input terminals, means connecting the other of said input terminals to said primary windings, means connecting the other electrode of said first transistor to one of said primary windings and to one of said feedback windings, means connecting said first resistance to the base electrode of said first transistor and to said one feedback winding, means connecting the other of said electrodes of said second transistor to the other of said primary windings, means connecting said other feedback winding to said one electrode of said second transistor and to said second resistance, means connecting said second resistance to the base electrode of said second transistor, rectifying means, and means connecting said rectifying means in circuit with said secondary winding of said transformer.

References Cited in the file of this patent
UNITED STATES PATENTS

| | | |
|---|---|---|
| 2,748,274 | Pearlman | May 29, 1956 |
| 2,783,384 | Bright | Feb. 26, 1957 |